United States Patent [19]

Yazaki

[11] Patent Number: 4,680,575
[45] Date of Patent: Jul. 14, 1987

[54] LIQUID LEVEL DETECTING DEVICE

[75] Inventor: Mitsuhiro Yazaki, Kakogawa, Japan

[73] Assignee: Kawasaki Jukogyo Kabushiki Kaisha, Japan

[21] Appl. No.: 686,676

[22] Filed: Dec. 27, 1984

[30] Foreign Application Priority Data

Dec. 28, 1983 [JP] Japan .................... 58-202321[U]

[51] Int. Cl.⁴ ................. G08B 21/00; H01H 35/18
[52] U.S. Cl. .................................. 340/624; 73/308;
200/84 B; 307/118; 340/693
[58] Field of Search ............... 340/624, 59, 693, 984,
340/52 D, 52 F, 333; 73/307, 308, 309, 313;
307/118, 9, 10 BP; 440/2; 180/53.8; 320/63;
200/84 B

[56] References Cited

U.S. PATENT DOCUMENTS 3,875,421 4/1975 Anshus ........................... 307/9
4,020,481 4/1977 Nakagawa ..................... 340/624
4,300,120 11/1981 Surman ....................... 340/693 X
4,473,730 9/1984 Ida ........................... 340/624 X Primary Examiner—Glen R. Swann, III
Assistant Examiner—Thomas J. Mullen, Jr.
Attorney, Agent, or Firm—Leydig, Voit & Mayer

[57] ABSTRACT

In a liquid level detecting device for fuel or oil in a small size boat, a liquid level detecting switch turned on and off in accordance with a vertical movement of a float provided in a tank and a liquid level warning device are connected in series to a power supply circuit from a generator of an engine.

1 Claim, 2 Drawing Figures

LIQUID LEVEL DETECTING DEVICE

BACKGROUND OF THE INVENTION

1. Field of the Invention

The present invention relates to a liquid level detecting device for use in a small size boat such as, for example, a jet ski.

2. Description of the Prior Art

For example, in a motorcycle, an oil level detecting switch and an oil level warning means such as an oil level warning lamp are electrically connected to a battery, so that when the oil level is lowered to a limit level, the warning lamp is turned on.

Such a motorcycle is provided with a key-operated or central switch. When the key-operated switch is turned on, the oil warning lamp is lighted for a while and then goes out. Then, when the oil level becomes low during running, the warning lamp will be turned on again as a warning. Such a construction is disclosed in Japanese Utility Model Application Laid-Open Nos. 42314/83 and 158107/83.

However, such a key-operated switch is not provided in a small size boat such as a jet ski. Therefore, if the warning lamp is electrically connected to the battery as in the motorcycle, upon the operation of the engine, there is no problem because of the charging of the battery, but when the engine is at a standstill, the lamp is turned on solely by the battery, as a result of which the battery is unduly consumed.

SUMMARY OF THE INVENTION

In order to overcome the above-noted defect, an object of the present invention is to prevent drainage of a battery when the engine is at a standstill, without providing a key-operated switch.

In order to attain the above-described object, according to the present invention, a liquid level detecting switch which is turned on and off according to a vertical movement of a float provided within a tank and a liquid level warning means are in series connection with a power supply circuit.

DETAILED DESCRIPTION OF THE PREFERRED EMBODIMENTS

Figure 1:
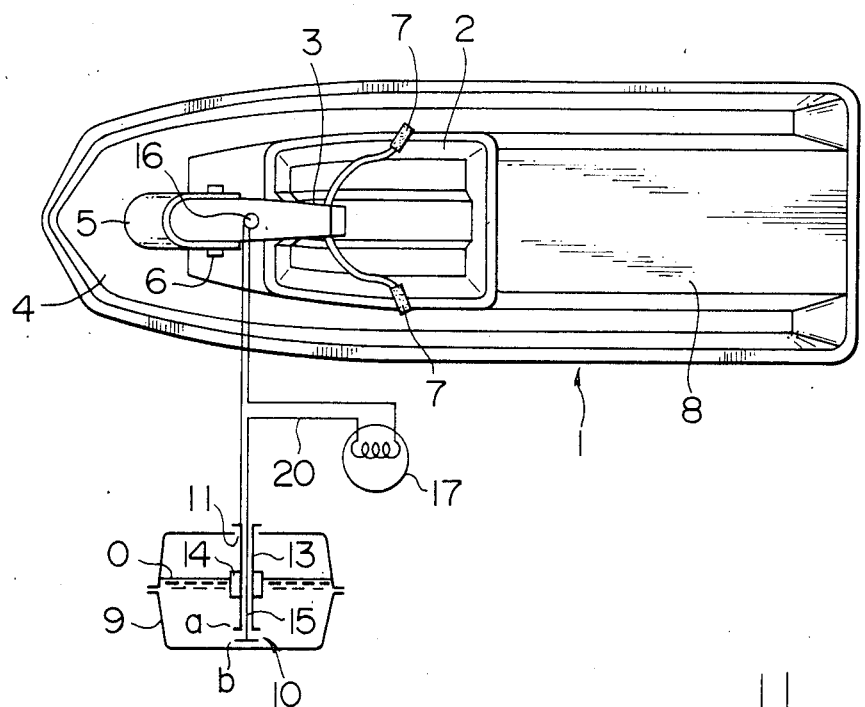
FIG. 1 is a plan view showing one embodiment of the present invention.

One embodiment of the invention will now be described with reference to the accompanying drawings. FIG. 1 shows an example of a jet ski. An engine not shown is mounted in a body 1 of the jet ski, and is covered by an engine cover 2 from above. A handle pole 3 is supported through a pivot shaft 6 to a pole bracket 5 extending from a deck 4. A pair of handle levers 7 provided at a rear end of the handle pole 6 are manipulated by the driver on a riding board 8 provided at a rear side of the body 1.

Oil 0 in the interior of an oil tank 9 provided in the body 1 is supplied through an oil pump (not shown) to a rear stage of a carburetor (not shown) of the engine. An oil level detecting switch 10 is provided in the oil tank 9 as described later.

Figure 2:
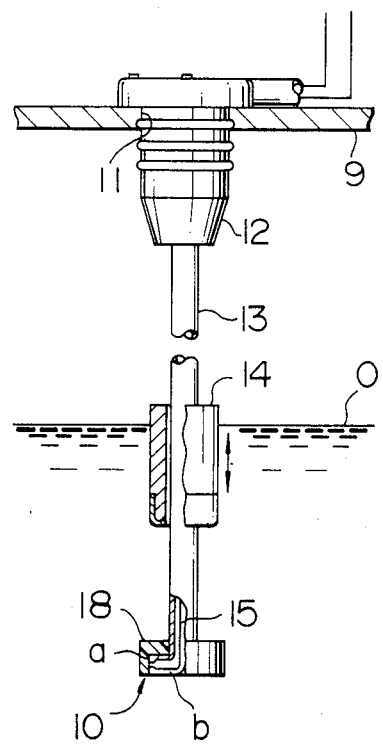
FIG. 2 is a cross-sectional view of an oil level detecting device provided in an oil tank.

Namely, as shown in FIG. 2, a mounting base 12 is inserted into a mounting bore 11 in an upper wall of the oil tank 9. A float 14 which is movable up and down in accordance with the level of the oil 0 is provided around a tubular float guide 13 suspending from the mounting base 12.

A movable contact a which may be flexed downward by the weight of the float is provided at a lower end of the float guide 13 per se. A fixed contact b which may contact with the movable contact a is provided at a lower end of a conductive plate 15 passing along the centerline of the float guide 13. These contacts a and b constitute the above-described oil level detecting switch 10. Thus, an oil level warning means 16 composed of an oil warning lamp mounted on the handle pole 3, and the oil level detecting switch 10 turned on and off in accordance with the vertical movement of the float 14 are in series connection with a power supply circuit 20 from a generator 17 (power generating coil) of the engine. Incidentally, an insulating sheet 18 made of resin is shown in FIG. 2.

With such a construction, when the level of the oil 0 is fully lowered, the float 14 causes the contact a to be pressingly lowered toward the contact b through the insulating sheet 18, so that the above-described switch 10 is brought into the conductive condition. In this case, when the jet ski is operated, the generator 17 shown in FIG. 1 serves as a power supply. Therefore, the oil level warning means 16 is turned on to warn the driver that the oil level has fallen below a predetermined position. On the other hand, when the jet ski is not operated, the generator 17 is of course in the inoperative condition. Therefore, even if the switch 10 is held in a conductive condition, the light indicator of the oil level warning means 16 will not work.

Incidentally, the above-described warning means 16 may be of the alternate on-off type or the alarm sound type.

Also, it is apparent to those skilled in the art that the present invention is not limited to the oil level detecting system but is applicable to a fuel level detecting system.

As has been described above, according to the present invention, an oil level detecting switch turned on and off in accordance with the vertical movement of a float provided within a tank and an oil level warning means are in series connection with a power supply circuit connected to a generator of the engine, without provision of a key-operated switch the battery is prevented from being consumed when the engine is at a standstill.

What is claimed is:

1. In a boat having an engine, the combination comprising:
   a generator driven by the engine,
   a tank for engine liquid,
   a liquid level detecting device including a float provided within said tank,
   a liquid level detecting switch operated by said float and turned on when the liquid level drops to a preset level, said liquid level detecting switch comprising fixed electrical contact means and flexible electrical contact means which close the circuit under the weight of said float when the liquid level drops to said preset level,
   a liquid level warning means connected in series with said switch, and
   circuit means free of a central switch connecting said series connected liquid level detecting switch and warning means to a power supply provided exclusively by said generator of said engine for providing a low engine liquid level warning while the engine is operating.

* * * * *